United States Patent [19]
Johnson

[11] Patent Number: 5,131,731
[45] Date of Patent: Jul. 21, 1992

[54] DRIVE SYSTEM FOR A TRACK TYPE VEHICLE

[75] Inventor: Clifton E. Johnson, Red Lake Falls, Minn.

[73] Assignee: Power Equipment Corporation, Osseo, Minn.

[21] Appl. No.: 647,304

[22] Filed: Jan. 28, 1991

[51] Int. Cl.⁵ .............................................. B62D 55/12
[52] U.S. Cl. ........................................ 305/56; 305/21; 305/57
[58] Field of Search ............ 305/21, 24, 35 R, 35 EB, 305/38, 39, 56, 57

[56] References Cited

U.S. PATENT DOCUMENTS

| | | | |
|---|---|---|---|
| 2,376,802 | 5/1945 | Morse | 305/38 |
| 2,531,111 | 11/1950 | Daniels | 305/38 |
| 2,560,307 | 7/1951 | Slemmons | 305/38 X |
| 3,357,752 | 12/1967 | Ruf | 305/56 |
| 3,762,012 | 10/1973 | Aker | 305/24 X |
| 4,861,120 | 8/1989 | Edwards et al. | 305/40 X |

Primary Examiner—Russell D. Stormer
Attorney, Agent, or Firm—Jerold M. Forsberg

[57] ABSTRACT

A drive system for a track type vehicle includes a drive wheel assembly having a rim with a sprocket attached thereto and a resilient frictional driving tire, at least one idler wheel assembly having a rim and a resilient tire with a central rib of a larger diameter, and an endless track having a plurality of serially spaced openings and protrusions extending generally perpendicularly from an inside surface. The protrusions cooperate with guide grooves in the wheels to maintain the alignment of the endless track with the wheels when the endless track is tensioned around the wheels. Frictional driving tires transmit substantially all of the driving force under normal conditions and sprocket teeth engaged with openings in the endless track prevent slippage under exceptional conditions.

22 Claims, 4 Drawing Sheets

DRIVE SYSTEM FOR A TRACK TYPE VEHICLE

BACKGROUND OF THE INVENTION

This application is copending with my other applications entitled "Drive Wheel Assembly" and "Idler Wheel Assembly."

The present invention relates generally to a drive system for a track type vehicle, and more specifically to a drive system which includes an endless flexible track, idler wheel assemblies, and a drive wheel assembly providing frictional engagement with the track as a primary source for driving the track under normal conditions and a sprocket type engagement for preventing slippage and driving the track under exceptional conditions.

Skid steer vehicles for use in construction and farming have been known for quite some time now and were made popular by the Melroe brothers of Gwinner, North Dakota. Vehicles of this type can be used with various types of equipment such as buckets, grapple forks, backhoes, and posthole augers. Typically, up until this time, skid steer type vehicles have had wheels and tires on each side of the vehicle which are driven independently of each other. Even though track type vehicles have been known for some time, none of the track related technology has been used and moreover none of the known track type vehicles have a drive system as taught by the instant invention. One prior art system, depicted in U.S. Pat. No. 3,120,409, shows an endless belt 10 with V-belt type construction used in conjunction with a pulley 40 having integrally formed sprockets and V-grooves. The V-grooves of pulley 40 provide the primary driving forces and the sprocket teeth, with their engagement in openings in the belt, providing the secondary, or backup, driving connection. Another endless traction assembly, depicted in U.S. Pat. No. 3,870,379, shows a flexible endless belt 14 driven by a drive sprocket 20 having teeth engaging in openings in the belt with a guide wheel 36 disposed adjacent to the drive sprocket to prevent the flexible belt from engaging the sprocket teeth all the way down to the root. Another track assembly, for a crawler type vehicle, depicted in U.S. Pat. No. 4,241,956, shows a drive wheel assembly having a sprocket 22 and cylindrical surfaces 88 on each of the cylinders 84 and 86, the surface being defined by an elastomeric sleeve 90. Yet another drive system, depicted in U.S. Pat. No. 4,453,611, shows a drive wheel assembly 31 which includes a drive sprocket 48 located between rims 46 and 47. Another drive system, depicted in U.S. Pat. No. 3,738,714, shows a pair of drive sprocket wheels 90 used in conjunction with bearing wheels 92. Finally, there is a drive sprocket wheel, depicted in U.S. Pat. No. 3,597,018, which includes an outer ring of one material for engaging the endless belt and an inner ring of natural or synthetic elastomeric resin for helping to absorb shocks that the endless belt may encounter. Clearly, none of these prior art systems anticipate the drive system as taught by the instant invention.

SUMMARY OF THE INVENTION

According to the present invention, a drive system for a track type vehicle includes an endless flexible track having serially spaced openings along the length thereof and spaced protrusions which act as guides extending perpendicularly from the inside surface of the track. The preferred endless track is one produced by Bridgestone Company, Ltd., and is known as their "rubber track". The drive system of the instant invention includes a drive wheel assembly which has a centrally disposed sprocket with resilient tires having high elasticity and a high coefficient of friction on either side thereof. The preferred drive system for a skid steer vehicle includes a pair of idler wheel assemblies for each endless track, it being understood that there is an endless track and a drive wheel assembly for each side of the vehicle. The pair of idler wheel assemblies of the preferred arrangement on each side of the vehicle are of different sizes and have resilient tires constructed of the same resilient material as the resilient tires of the drive wheel assembly. Each resilient tire has a circumferential face which is configured to cooperate with the configuration of the inside of the endless track.

Accordingly, it is an object of the present invention to provide a drive system for an endless track for use with skid steer type vehicles.

It is another object of the instant invention to provide a drive system which limits the amount of endless track in direct engagement with a generally smooth and firm surface.

Yet another object of the invention is to provide a drive system for a skid steer type vehicle which includes a drive wheel assembly and an idler wheel assembly which absorb some shocks to thereby provide a better ride for the driver.

Another object of this invention is to provide a drive system wherein the resilient tires of the drive wheel assembly normally provide all of the driving force to the endless track and the sprocket prevents slippage under exceptional conditions.

It is also an object of this invention to provide a drive system which overcomes the problems of endless tracks with skid steer vehicles and which is efficient and economical.

Other objects and advantages of the present invention will be apparent and understood from the following detailed description when taken in conjunction with the accompanying drawings.

DETAILED DESCRIPTION OF THE PREFERRED EMBODIMENT

Figure 1:
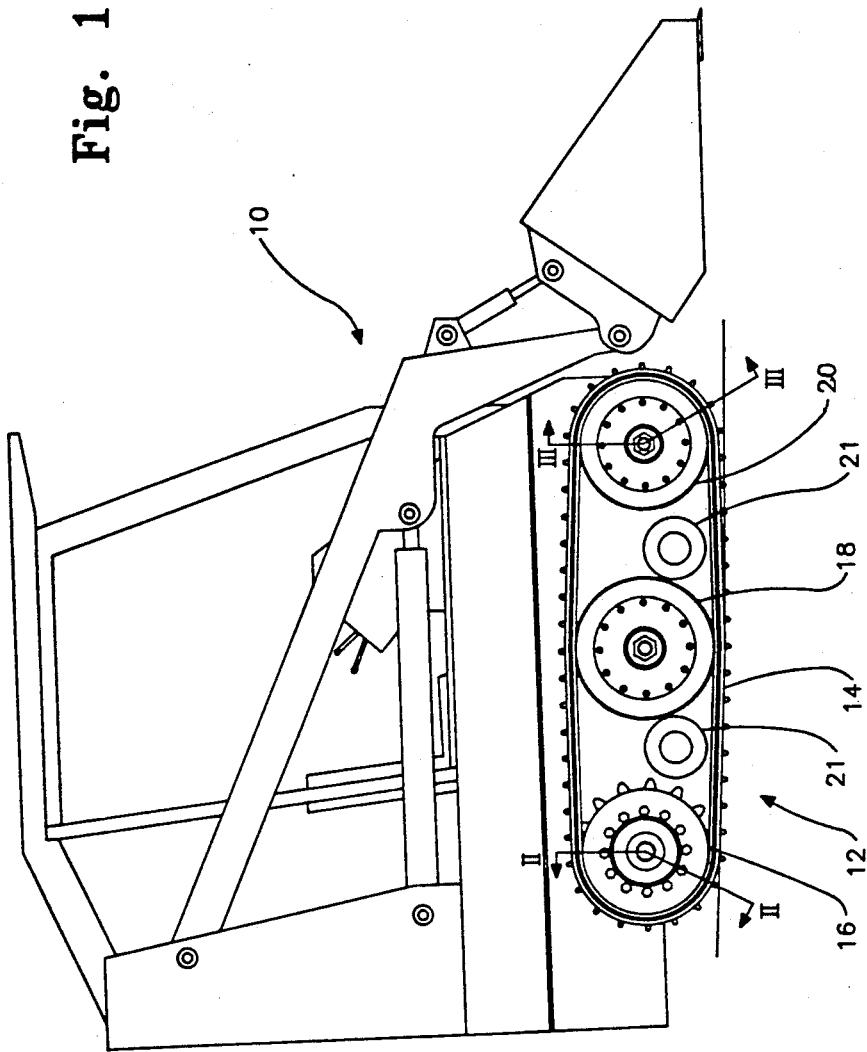
FIG. 1 is a side view of a skid steer type loader utilizing the drive system of the instant invention.

Reference hereinbelow is made to the drawings wherein like reference numerals have been employed to designate the same or similar components throughout the various views.

Referring now to FIG. 1, a skid steer vehicle 10 includes a drive system 12 having an endless track 14 driven by a drive wheel assembly 16 and guided by a center idler wheel assembly 18 and a front idler wheel assembly 20. It being understood that a drive system is included on opposite sides of the vehicle and that the drive systems are driven independently of one another to skid steer the vehicle and are operated in concert to move the vehicle either forward or backward. A smaller idler wheel 21, of solid construction, is disposed on either side of the center idler wheel 18. Each of the smaller idler wheels are spaced one-half to three-fourths of an inch above the inside of endless track 14, the reason for which will be discussed later.

Figure 2:
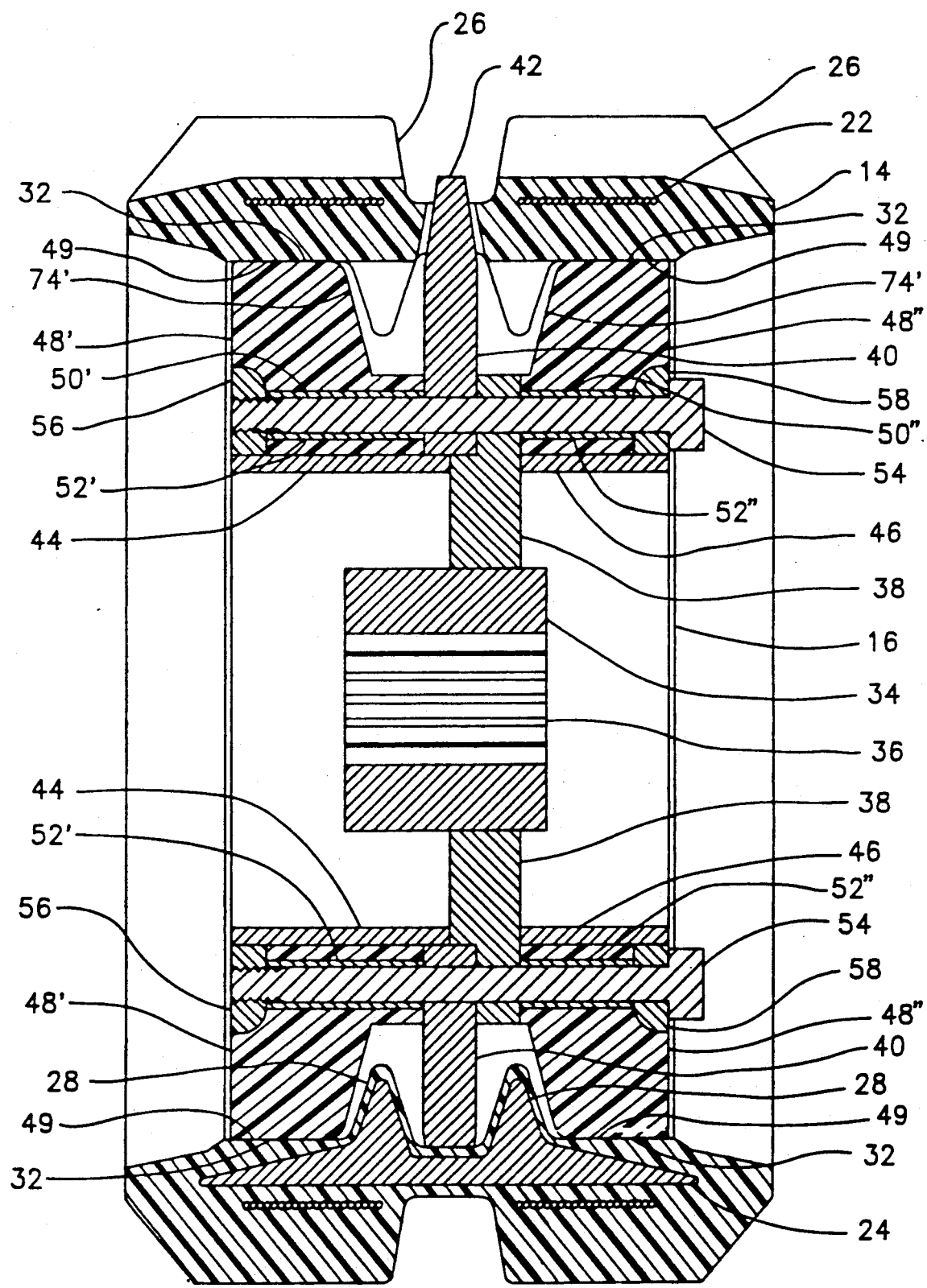
FIG. 2 is a sectional view of the drive wheel assembly taken along line II—II in FIG. 1.
Figure 4:
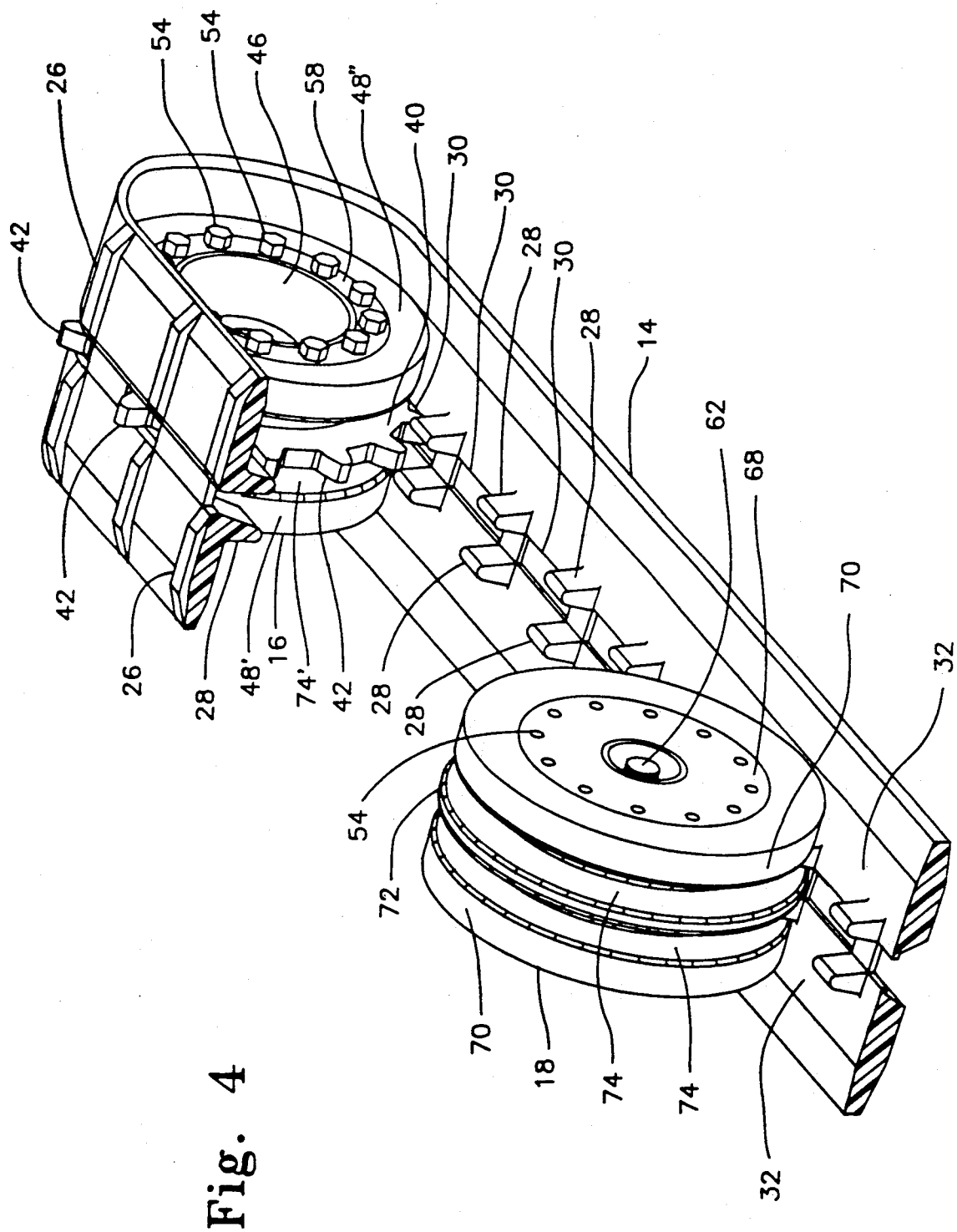
FIG. 4 is a fragmentary, partially sectioned view, of the drive system of this invention.

FIG. 2 shows a cross section of the drive wheel assembly 16 and its relationship to the endless track 14. Endless track 14 is preferably of a rubber composition and includes longitudinally extending steel strands 22 and transversely extending reinforcing elements 24 embedded in the track at the time of manufacture for strengthening the track. Endless track 14 includes traction lugs 26 spaced along the outside thereof, protrusions 28 extending generally perpendicularly from the reinforcing elements 24 along the inside thereof, and, as best seen in FIG. 4, a series of openings 30 evenly spaced down the center thereof. A reinforcing element 24 with protrusions 28 is disposed between each pair of adjacent openings 30 thereby reinforcing each of the openings and endless track 14 includes traction surfaces 32 disposed outside of protrusions 28 on the inside surface of the endless track, the reason for which will become apparent. Drive wheel 16 includes a center hub 34 having a central splined bore 36. The center hub 34 has a sprocket mounting disc 38 fixedly secured thereto by, for example, welding, and includes a notch in its peripheral edge such that a sprocket ring 40 can be positioned and attached thereto, for example, by bolting or welding. Sprocket ring 40 includes sprocket teeth 42 circumferentially spaced around the outer periphery there of. Cylindrical sections 44 and 46 are fixedly secured to sprocket mounting disc 38 so as to extend in opposite directions therefrom. Inner resilient frictional driving tire 48' and outer tire 48" have a central bore which is substantially the same diameter as the outer diameter of the cylindrical sections 44 and 46. Resilient frictional tires 48' and 48" include bores 50' and 50" for receiving spacer sleeves 52' and 52" which in turn receive bolts 54 therethrough. Clamping ring 56 includes threaded bores for receiving threaded ends of bolts 54 and clamping ring 58 includes bores for receiving bolts 54 therethrough.

Once the rim has been constructed, i.e. when the components which are fixedly secured to one another have been assembled, the resilient frictional driving tires can then be slipped over respective cylindrical sections 44 and 46. Spacer sleeves 50' and 50" are then inserted in respective bores 50' and 50" and bolts 54 are inserted through the bores in the outer clamping ring, the spacer sleeves and aligned bores through the sprocket ring and sprocket mounting disc and threaded into the threaded bores in clamping ring 56. Bolts 54 are securely tightened without concern that the frictional driving tires will be compressed and the inherent capabilities thereof hindered.

Figure 3:
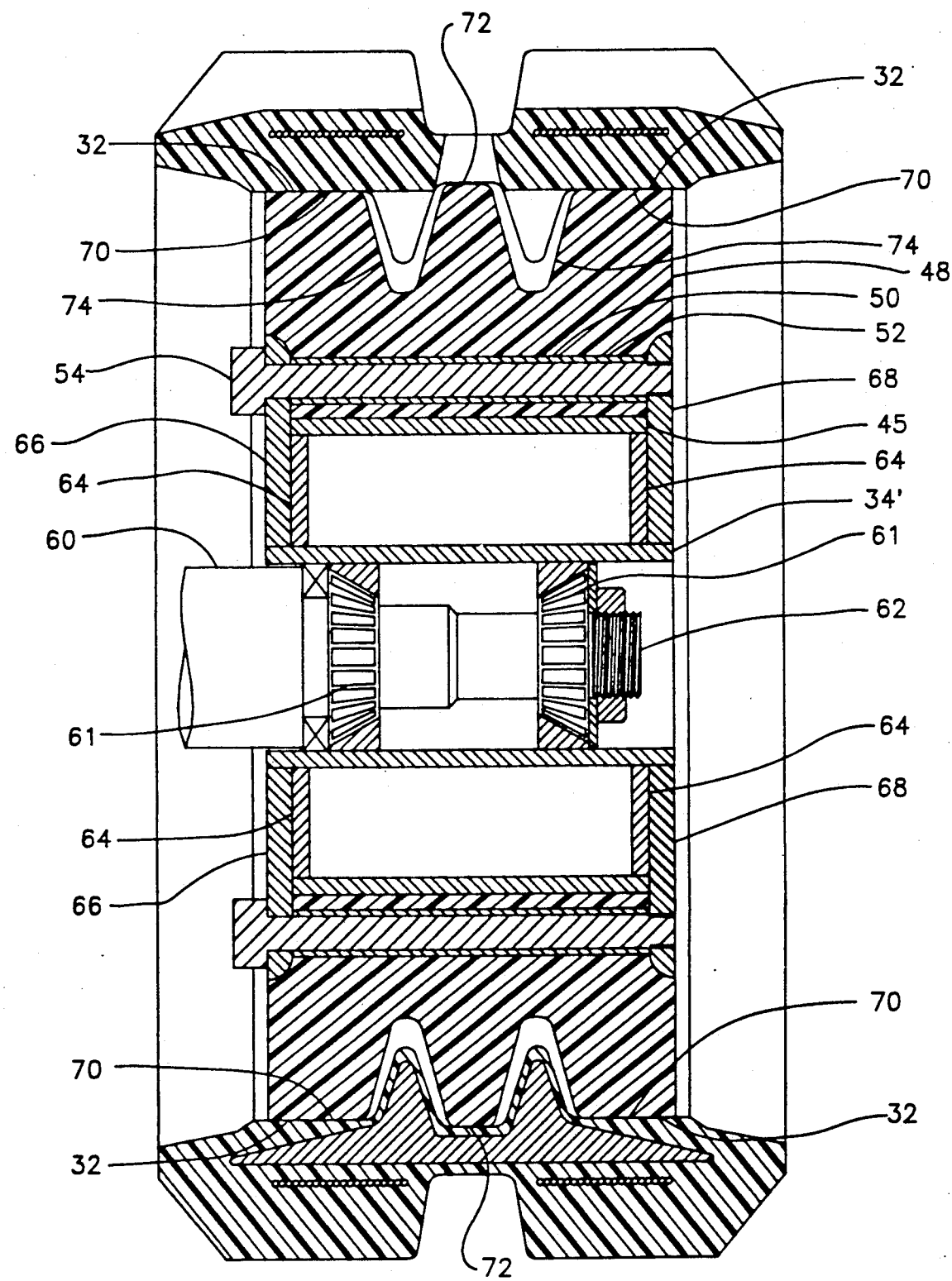
FIG. 3 is a sectional view of the idler wheel assembly taken along line III—III in FIG. 1.

Referring now to FIG. 3, it will be seen that there is generally a similar construction of the idler wheels except that there is a single cylindrical section 45 and that central hub 34' includes an arrangement for utilizing bearings to mount the idler wheel assembly to an axle 60 which has a threaded end 62. Cylindrical section 45 is maintained in a spaced relationship to center hub 34' by support disks 64. Support disks 64 are spaced inwardly from the ends of hub 34' the thickness of inner clamping ring 66 and outer clamping ring 68. Inner clamping ring 66 is fixedly secured to center hub 34' and cylindrical section 45, for example, by welding. Inner clamping ring 66 includes bores for receiving bolts 54 therethrough and outer clamping ring 68, which is removable, includes threaded bores for receiving the threaded ends of bolts 54. Resilient tire 48 includes spacer sleeves 52 in bores 50 and is received on cylindrical section 45 with bolts 54 extending through the spacer sleeves 52 and threadedly engaged in the threaded bores in clamping plate 68 to thereby secure resilient tire 48 relative to the rim. Again, it should be noted that the bolts and clamping plates, in conjunction with the spacer sleeves, do not compress the material of which the tire is made. Resilient tire 48 includes a circumferential surface 70 on either side of a central rib 72. Between each of the circumferential surfaces 70 and central rib 72 are guide grooves 74 which include sidewalls that are angled at generally 75 degrees relative to the circumferential surfaces 70. These sidewalls generally conform to the sides of protrusions 28 which are angled at about 75 degrees relative to the traction surfaces 32. Central rib 72 is of a slightly greater diameter than the diameter of the portion of the resilient tire 48 which is bounded by the circumferential surfaces 70. When track 14 is tensioned around the drive wheel 16 and the idler wheels 16 and 18 there is a slight compression of the end of each of the ribs 72 causing each to more effectively act as a guide relative to openings 30 i.e., as track 14 moves relative to the idler wheels, the rib 72 seeks the openings 30 in an attempt to relieve the extra compression. Additionally, it should be readily apparent that groves 74 cooperate with protrusions 28 to maintain alignment of the endless track with the idler wheels. It should also be apparent that the endless track is maintained in its alignment with the drive wheel assembly not only by the grooves 74', but also by the sprocket teeth 42.

Resilient frictional driving tires 48' and 48" have two purposes. The first is to provide under normal conditions substantially all of the driving force from the power system of vehicle 10 to the endless track 14. The second is accomplished when the resilient frictional driving tires have sufficient thickness to be able to cushion shocks caused by the terrain over which the vehicle is passing which would normally transmitted to the vehicle and, accordingly, to the operator. Of course, this second purpose is also accomplished by the idler wheel assemblies. It is the passage over rough terrain which creates the need for small idlers 22 to be spaced above the inside of endless track 14 such that they are not normally engaged with the area of the endless track between the protrusions except when a bump of some magnitude is encountered. They then will assist in maintaining the alignment of the endless track relative to the idler wheels.

It has been found that for a vehicle weighing about 4,600 pounds, the endless track needs to be tensioned to about 2,700 pounds. Thus, a vehicle with two endless tracks should support up to 5,400 pounds. Greater tensions will be necessary for larger vehicles.

While this invention has been described with a certain degree of particularity, it is manifest that many changes may be made in the details of construction and in the arrangement of components without departing from the spirit and scope of the disclosure. It is understood that the invention is not limited to the embodiments set forth herein for purposes of exemplification, but is limited only by the scope of the attached claims, including the full range of equivalency to which each element thereof is entitled.

What is claimed is:

1. A drive system for a track type vehicle comprising: drive wheel means having rim means, sprocket means with circumferentially spaced sprocket teeth, and resilient tire means with at least one circumferentially disposed frictional driving surface; idler wheel means having rim means and resilient tire means with at least one circumferentially disposed surface; and endless track means having a series of spaced openings, transverse reinforcing means disposed between adjacent openings, and at least one surface on an inside thereof for engagement by the at least one frictional driving surface of said drive wheel means and the at least one circumferentially disposed surface of the idler wheel means; said endless track means being tensioned around said drive wheel means and said idler wheel means such that said at least one frictional driving surface of said drive wheel means is in positive frictional engagement with said at least one surface on the inside of said endless track means and sprocket teeth of said sprocket means extend through aligned openings of said openings in said endless track means; said resilient tire means being constructed of material providing for positive frictional engagement of said at least one frictional driving surface of said drive wheel means with said at least one surface on the inside of said endless track means and cushioning of shocks received by said endless track means; whereby said at least one frictional driving surface of the drive wheel means normally imparts substantially all of the driving force to the endless track means for moving the vehicle and the sprocket teeth of said sprocket means cooperate with aligned openings in the endless track means to prevent slippage of the endless track means relative to the drive wheel means under exceptional conditions.

2. A drive system as set forth in claim 1 wherein said at least one circumferentially disposed frictional driving surface of said drive wheel means includes two circumferentially disposed frictional driving surfaces, said at least one circumferentially disposed surface of said idler wheel means includes two circumferentially disposed surfaces and said at least one surface on an inside of said endless track means includes two surfaces on an inside thereof for engagement by said two circumferentially disposed frictional driving surfaces of said drive wheel means and said two circumerentially disposed surfaces of said idler wheel means.

3. A drive system as set forth in claim 2 wherein the two circumferentially disposed frictional driving surfaces on the drive wheel means are disposed on opposite sides of the sprocket means.

4. A drive system as set forth in claim 3 wherein said series of openings is aligned down the center of the endless track means.

5. A drive system as set forth in claim 4 wherein the resilient tire means of said idler wheel means has a center rib of a diameter larger than a diameter of the circumferentially disposed surfaces, said circumferentially disposed surfaces being disposed on opposite sides of said center rib.

6. A drive system as set forth in claim 1 wherein the drive system includes a second idler wheel means of generally the same configuration as the first mentioned idler wheel means, said second idler wheel means having resilient tire means having a greater diameter than the diameter of said resilient tire means of said first mentioned idler wheel means, said second idler wheel means being disposed between said first mentioned idler wheel means and the drive wheel means thereby reducing the amount of endless track means in contact with a firm and smooth terrain.

7. A drive system for a track type vehicle comprising: drive wheel means having rim means, sprocket means with circumferentially spaced sprocket teeth, and resilient tire means with two circumferentially disposed frictional driving surfaces, each of the two circumferentially disposed frictional driving surfaces being disposed on opposite sides of the sprocket means; idler wheel means having rim means and resilient tire means with two circumferentially disposed surfaces, each of the two circumferentially disposed surfaces being disposed on opposite sides of a center rib having a diameter larger than a diameter of the two circumferentially disposed surfaces; and endless track means having a series of spaced openings aligned along the center of the endless track means, transverse reinforcing means disposed between adjacent openings, and two surfaces on an inside thereof for engagement by the two frictional driving surfaces of said drive wheel means and the two circumferentially disposed surfaces of the idler wheel means; said drive wheel means including a guide groove on each side of said sprocket means and said idler wheel means including a guide groove on each side of said center rib, said endless track means including protrusions cooperating with said guide grooves for guiding the track means relative to the drive wheel means and the idler wheel means; said endless track means being tensioned around said drive wheel means and said idler wheel means such that said two frictional driving surfaces of said drive wheel means are in positive frictional engagement with said two surfaces on the inside of said endless track means and sprocket teeth of said sprocket means extend through aligned openings of said openings in said endless track means; said resilient tire means being constructed of material providing for positive frictional engagement of said frictional driving surfaces of said drive wheel means with said two surfaces of said endless track means and cushioning of shocks received by said endless track means; whereby said two frictional driving surfaces of the drive wheel means normally impart substantially all of the driving force to the endless track means for moving the vehicle and the sprocket teeth of said sprocket means cooperate with the aligned openings in the endless track means to prevent slippage of the endless track means relative to the drive wheel means under exceptional conditions.

8. A drive system as set forth in claim 7 wherein said protrusions have angled side surfaces which are generally 75 degrees relative to the surfaces on the inside of the endless track and said guide grooves include angled sides complimentary to the angled sides of the protrusions, the angled sides of the guide grooves being generally at 75 degrees relative to the circumferential surfaces.

9. A drive system as set forth in claim 8 wherein said endless track means is tensioned about said drive wheel means and said idler wheel means to at least 2,700 pounds.

10. A drive system as set forth in claim 9 wherein said vehicle is a skid steer type of vehicle.

11. A drive system as set forth in claim 7 wherein the drive system includes a second idler wheel means of generally the same configuration as the first mentioned idler wheel means, said second idler wheel means having resilient tire means having a greater diameter than the diameter of said resilient tire means of said first mentioned idler wheel means, said second idler wheel means being disposed between said first mentioned idler wheel means and the drive wheel means thereby reducing the amount of endless track means in contact with a firm and smooth terrain.

12. A drive system as set forth in claim 11 wherein a first small idler wheel means is disposed between said first mentioned idler wheel means and said second idler wheel means and a second small idler wheel means is disposed between said second idler wheel means and said drive wheel means.

13. A drive system as set forth in claim 12 wherein said protrusions have angled side surfaces which are generally 75 degrees relative to the surfaces on the inside of the endless track and said guide grooves include angled sides complimentary to the angled sides of the protrusions, the angled sides of the guide groves being generally at 75 degrees relative to the circumferential surfaces.

14. A drive system as set forth in claim 13 wherein said resilient tire means of said drive wheel means is of a diameter greater than the root diameter of the sprocket teeth.

15. A drive system as set forth in claim 14 wherein said endless track means is tensioned about said drive wheel means and said idler wheel means to at least 2,700 pounds.

16. A drive system as set forth in claim 15 wherein said vehicle is a skid steer type of vehicle.

17. A drive system as set forth in claim 11 wherein said rim means for said drive wheel means includes first and second cylinders attached to a sprocket mounting disk, a pair of clamping plates wherein a first of said clamping plates has threaded bores and a second clamping plate releasably mounts to said resilient tire means by bolts extending through bores therein, and spacers disposed in bores in said resilient tire means and for receiving said bolts therethrough, said spacers preventing said clamping plates and said bolts from compressing the resilient tire means to a point where the cushioning effect of the solid material would be lost.

18. A drive system as set forth in claim 17 wherein said rim means for said idler wheel means includes a cylinder held in spaced relationship relative to a hub by a pair of spacer means, a pair of clamping plates wherein one of said clamping plates is fixedly secured to said cylinder and a second clamping plate releasably mounts said resilient tire means by bolts extending through bores therein and spacers disposed in bores in said resilient tire means, said spacers preventing said clamping plates and said bolts from compressing the resilient tire means to a point where the cushioning effect of the solid material would be lost.

19. A drive system as set forth in claim 18 wherein said resilient tire means of said drive wheel means and said idler wheel means are constructed of urethane and said endless track means is a rubber composition.

20. A drive system as set forth in claim 7 wherein said rim means for said drive wheel means includes first and second cylinders attached to a sprocket mounting disk, a pair of clamping plates wherein a first of said clamping plates has threaded bores and a second clamping plate is utilized to mount said resilient tire means by bolts extending through bores therein, and spacers disposed in bores in said resilient tire means for receiving said bolts therethrough, said spacers preventing said clamping plates and said bolts from compressing the resilient tire means to a point where the cushioning effect of the solid material would be lost.

21. A drive system as set forth in claim 20 wherein said rim means for said idler wheel means includes a cylinder held in spaced relationship relative to a hub by a pair of spacer means, a pair of clamping plates wherein one of said clamping plates is fixedly secured to said cylinder and a second clamping plate releasably mounts said resilient tire means by bolts extending through bores therein and spacers disposed in bores in said resilient tire means, said spacers preventing said clamping plates and said bolts from compressing the resilient tire means to a point where the cushioning affect of the solid material would be lost.

22. A drive system as set forth in claim 21 wherein said resilient tire means of said drive wheel means and said idler wheel means are constructed of urethane and said endless track means is a rubber composition.

* * * * *